US012344291B2

(12) United States Patent
Piparsaniya

(10) Patent No.: US 12,344,291 B2
(45) Date of Patent: Jul. 1, 2025

(54) SYSTEM AND METHOD FOR MONITORING FAILURE OF TRAINS INSIDE TUNNELS

(71) Applicant: Siemens Mobility, Inc., New York, NY (US)

(72) Inventor: Harsh Piparsaniya, Pune (IN)

(73) Assignee: Siemens Mobility, Inc., NewYork, NY (US)

( * ) Notice: Subject to any disclaimer, the term of this patent is extended or adjusted under 35 U.S.C. 154(b) by 384 days.

(21) Appl. No.: 17/460,426

(22) Filed: Aug. 30, 2021

(65) Prior Publication Data

US 2023/0066917 A1 Mar. 2, 2023

(51) Int. Cl.

| | |
|---|---|
| ***B61L 15/00*** | (2006.01) |
| ***B61L 23/00*** | (2006.01) |
| ***B61L 25/02*** | (2006.01) |
| ***B61L 27/20*** | (2022.01) |
| ***B61L 27/57*** | (2022.01) |
| *G08B 25/00* | (2006.01) |

(52) U.S. Cl.

CPC ........... *B61L 15/0054* (2013.01); *B61L 23/00* (2013.01); *B61L 25/021* (2013.01); *B61L 25/025* (2013.01); *B61L 27/20* (2022.01); *B61L 27/57* (2022.01); *G08B 25/008* (2013.01)

(58) Field of Classification Search

CPC .. B61L 15/02; B61L 15/0027; B61L 15/0054; B61L 15/150072; B61L 15/0081; B61L 23/08; B61L 23/14; B61L 23/00; B61L 23/12; B61L 25/00; B61L 25/021; B61L 25/025; B61L 27/20; B61L 27/40; B61L 27/57; B61L 27/70; G08B 25/008

USPC ........................................................ 246/122 R

See application file for complete search history.

(56) References Cited

U.S. PATENT DOCUMENTS

| | | | | |
|---|---|---|---|---|
| 6,865,454 | B2 * | 3/2005 | Shockley | B61L 15/0062 701/19 |
| 8,888,051 | B2 * | 11/2014 | Mardirossian | B61L 29/30 246/111 |
| 11,148,692 | B2 * | 10/2021 | Bramucci | B61L 27/57 |
| 2016/0257325 | A1 * | 9/2016 | Kernwein | B61L 27/53 |
| 2023/0311958 | A1 * | 10/2023 | Mazzone | B61L 15/0072 701/19 |

* cited by examiner

*Primary Examiner* — S. Joseph Morano
*Assistant Examiner* — Heaven R Buffington

(57) ABSTRACT

A system and method for monitoring failure of a train within a tunnel is disclosed. The method comprises receiving, by the central server, an estimated crossing time for the train to cross the tunnel and the latest location of the train from a telemetry system onboard the train. The telemetry system comprises a Head-of-Train device communicatively coupled to an End-of-Train device. The method further comprises detecting a failure event associated with the train, by the central server, if an attempt to establish communication with the telemetry system is unsuccessful after the estimated crossing time. The method further comprises broadcasting, by the central server, an emergency alert message indicating the failure event to one or more receiving devices based on the latest location of the train. The receiving device is associated with at least one of an operator control station and an adjacent train.

17 Claims, 7 Drawing Sheets

SYSTEM AND METHOD FOR MONITORING FAILURE OF TRAINS INSIDE TUNNELS

TECHNICAL FIELD

The present invention relates to a monitoring systems for railways, and more particularly relates to a system and method for monitoring failure of a train within a tunnel.

BACKGROUND

Telemetry system in a train includes an End-of-Train device, located at a rear-end of the train, communicatively coupled to a Head-of-Train device located within a driver's cab of the train. The End-of-Train device eliminates the need for a caboose, by transmitting critical data related to for example, brake line pressure, to the Head-of-Train device. Similarly, the Head-of-Train device also transmits instructions to the End-of-Train device, e.g. for activating a visibility marker associated with the End-of-Train device. The End-of-Train device and Head-of-Train device communicate over a dedicated radio-based telemetry link. In addition the End-of-Train device is also configured to send statuses associated with the train to a server via a GSM network.

During normal running conditions, the Head-of-Train device and the End-of-Train device consistently communicate with each other for performing vital functions related to the operation of the train. When the train enters a tunnel, communication between the Head-of-Train device and End-of-Train device is hindered due to disruption of the telemetry link. Similarly, communication between the End-of-Train device and the server may also get disrupted. Consequently, the End-of-Train device and the Head-of-Train device, as telemetry systems, may not perform the intended functions inside the tunnel. Further, if a failure of the train occurs inside the tunnel, the telemetry system may not be able to update the server about the failure. Examples of failures include derailment, accidents, accidental separation, application of emergency brakes due to unforeseen events and faults in the railway track.

At present, leaky cables are installed inside tunnels to act as a back-up communication channel for enabling communication between railway crew on the train as well as with operator control stations. However, such leaky cables require considerable hardware installation within the tunnel and also frequent maintenance of the hardware to protect the leaky cable from ambient conditions inside the tunnel. In case the leaky cables are damaged, the railway personnel may not be able to seek help from the operator control station in the event of failures. Similarly, as the telemetry system is not functional within the tunnel, the driver may not notice if accidental separation of the train occurs within the tunnel.

In light of the above, there is a need for a mechanism to detect failure of a train within a tunnel.

SUMMARY

In an aspect of the present invention, a system for monitoring failure of a train within a tunnel is disclosed. The system includes a central server, and a telemetry system situated onboard the train. The telemetry system includes a Head-of-Train device communicatively coupled to an End-of-Train device. The Head-of-Train device is configured to compute an estimated crossing time for crossing the tunnel based on a distance to the tunnel, a length of the tunnel, a length of the train and a speed of the train, and to transmit the estimated crossing time to the End-of-Train device. The End-of-Train device is configured to receive the estimated crossing time from the Head-of-Train device, and to transmit the estimated crossing time and a latest location of the train to the central server.

In an embodiment, the system further includes a sensing unit communicatively coupled to the Head-of-Train device. The sensing unit is configured to detect presence of the tunnel ahead of the train, and to measure the distance to the tunnel, from the train, in real-time upon detecting presence of the tunnel. In a further embodiment, the sensing unit includes at least one of an image sensor, a LIDAR sensor, an infrared sensor and an ultrasonic sensor.

The central server is configured to receive the estimated crossing time and the latest location of the train from the telemetry system. The central server further detects a failure event associated with the train if an attempt to establish communication with the telemetry system is unsuccessful after the estimated crossing time. The central server further broadcasts an emergency alert message indicating the failure event to one or more receiving devices based on the latest location of the train. The receiving device is associated with at least one of an operator control station and an adjacent train. In an embodiment, the central server is configured to identify the adjacent train based on the latest location received from the End-of-Train device. In one embodiment, the central server is further configured to broadcast a clear message to the one or more receiving devices if the communication with the telemetry is reinstated after detecting the failure event. The clear message indicates resolution of the failure event.

In one embodiment, the telemetry system further includes a subsystem configured to detect accidental decoupling of the train when an attempt to initiate communication with the End-of-Train device fails after the estimated crossing time. The at least one subsystem further transmits an integrity status message indicating the accidental decoupling to the central server. In an embodiment, the at least one subsystem is the Head-of-Train device. In another embodiment, the at least one subsystem is a Middle-of-Train device. In a further embodiment, the central server is further configured to receive the integrity status message indicating the accidental decoupling of the train, from the at least one subsystem. The central server further broadcasts an emergency alert message to the one or more receiving devices based on the integrity status message received.

In another aspect, a method for monitoring failure of a train within a tunnel is disclosed. The method includes receiving, by a central server, an estimated crossing time for the train to cross the tunnel and the latest location of the train from a telemetry system onboard the train. The telemetry system includes a Head-of-Train device communicatively coupled to an End-of-Train device. The estimated crossing time for crossing the tunnel is computed by the Head-of-Train device based on a distance to the tunnel, a length of the tunnel, a length of the train and a speed of the train. In an embodiment, the distance to the tunnel from the train, is measured by a sensing unit communicatively coupled to the Head-of-Train device, in real-time, upon detecting presence of the tunnel.

The method further includes detecting a failure event associated with the train, by the central server, if an attempt to establish communication with the telemetry system is unsuccessful after the estimated crossing time. The method further includes broadcasting an emergency alert message indicating the failure event to one or more receiving devices based on the latest location of the train. The receiving device is associated with at least one of an operator control station and an adjacent train. In an embodiment, the method further includes identifying the adjacent train, by the central server, based on the latest location received from the End-of-Train device. In an embodiment, the method may further include broadcasting, by the central server, a clear message to the one or more receiving devices if communication with the telemetry is reinstated after detecting the failure event, wherein the clear message indicates resolution of the failure event.

In an embodiment, the method may further include receiving, by the central server, an integrity status message indicating accidental decoupling of the train, from at least one subsystem. In a further embodiment, the accidental decoupling of the train is detected, by the at least one subsystem, when an attempt to initiate communication with the End-of-Train device fails after the estimated crossing time. In an embodiment, the at least one subsystem is the Head-of-Train device. In another embodiment, the at least one subsystem is a Middle-of-Train device. The method may further include broadcasting, by the central server, an emergency alert message to the one or more receiving devices based on the integrity status message received.

The above-mentioned attributes, features, and advantages of this invention and the manner of achieving them, will become more apparent and understandable (clear) with the following description of embodiments of the invention in conjunction with the corresponding drawings. The illustrated embodiments are intended to illustrate, but not limit the invention.

BRIEF DESCRIPTION OF FIGURES

The present invention is further described hereinafter with reference to illustrated embodiments shown in the accompanying drawings, in which.

DETAILED DESCRIPTION

Figure 1A:
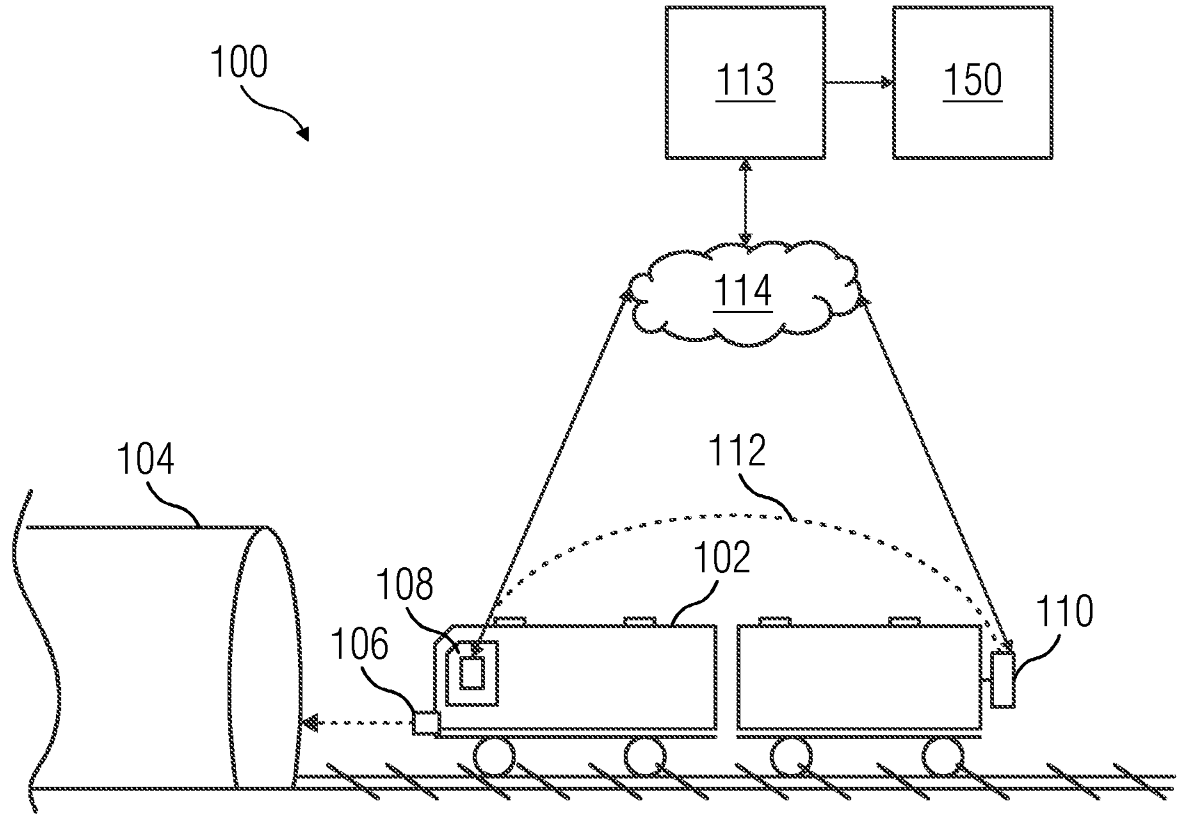
FIG. 1A illustrates a system for monitoring failure of a train inside a tunnel, in accordance with an embodiment of the present invention.

Various embodiments of the present invention are described with reference to the drawings, where like reference numerals are used in reference to the drawings. Like reference numerals are used to refer to like elements throughout. In the following description, numerous specific details are set forth in order to provide a thorough understanding of embodiments. These specific details need not be employed to practice embodiments. In other instances, well known materials or methods have not been described in detail in order to avoid unnecessarily obscuring embodiments. While the disclosure is susceptible to various modifications and alternative forms, specific embodiments thereof are shown by way of example in the drawings and will herein be described in detail. There is no intent to limit the disclosure to the particular forms disclosed. Instead, the disclosure is to cover all modifications, equivalents, and alternatives falling within the scope of the present invention.

FIG. 1A illustrates a system 100 for monitoring failure of a train 102 inside a tunnel 104, in accordance with an embodiment of the present invention. The system 100 comprises a sensing unit 106 communicatively coupled to a Head-of-Train device 108 located inside a driver's cab of the train 102. The Head-of-Train device 108 is further communicatively coupled to an End-of-Train device 110 via a radio-based telemetry link 112, to form a telemetry system. The telemetry system is further connected to a remotely located central server 113 via network 114. In an embodiment, the network 114 is a GSM network.

The sensing unit 106 includes one or more sensors configured to detect presence of the tunnel 104 ahead of the train 102, and to measure distance of the train 102 from the tunnel 104 in real-time. Non-limiting examples of the sensing unit 106 may include image sensors, ultrasonic distance sensors, infrared distance sensors, LIDAR sensors and time-of-flight sensors. In an embodiment, the sensing unit 106 is an image sensor configured to capture an image of the tunnel 104. The image captured by the image sensor is further processed in order to detect presence of the tunnel 104. In an embodiment, a micro-computer is employed to process the image captured by the image sensor, using object recognition algorithms that are pre-trained to identify tunnels. Further, a distance sensor such as the ultrasonic distance sensor in the sensing unit 106 measures a distance to the tunnel 104 (length indicated by the dashed arrow from the sensing unit 106 to the tunnel 104), upon detection of the tunnel 104. In an implementation, the sensing unit 106 is triggered for measuring the distance to the tunnel 104 based on a latest location of the train 102. The term 'latest location of the train' as used herein refers to the last Global Navigation Satellite System (GNSS) location detected by the End-of-Train device 110.

Figure 1B:
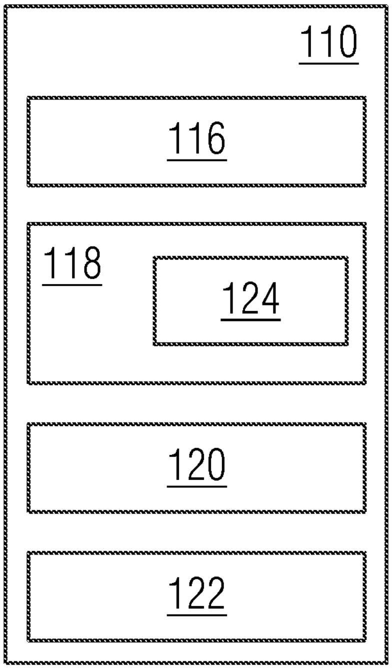
FIG. 1B illustrates a block diagram of an End-of-Train device, in accordance with an embodiment of the present invention.

The End-of-Train device 110 comprises a first processing unit 116, a first memory 118, a first GNSS receiver 120 and a first communication unit 122 as shown in FIG. 1B. The first processing unit 116 includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor or any other type of processing circuit. The first processing unit 116 may also include embedded controllers, such as generic or programmable logic devices or arrays, application specific integrated circuits, single-chip computers, and the like. In general, the first processing unit 116 comprises hardware elements and software elements. The first processing unit 116 can be configured for multithreading, i.e., the first processing unit 116 hosts different calculation processes at the same time, executing the either in parallel or switching between active and passive calculation processes.

The first memory 118 includes one or more of a volatile memory and a non-volatile memory. The first memory 118 is coupled for communication with the first processing unit 116. The first processing unit 116 executes instructions and/or code stored in the first memory 118. A variety of computer-readable storage media is stored in and accessed from the first memory 118. The first memory 118 may include any suitable element for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like.

The first memory 118 comprises a first update module 124 that is stored in the form of machine-readable instructions for execution by the first processing unit 116. These machine-readable instructions when executed causes the first processing unit 116 to transmit periodic update messages to the central server 113. The first memory 118 also stores a unique identifier associated with the End-of-Train device 110.

The first GNSS receiver 120 enables the End-of-Train device 110 to receive GNSS data from a plurality of GNSS satellites. Based on the GNSS data, the first processing unit 116 determines a geospatial location of the End-of-Train device 110. The term 'geospatial location' as used herein, refers to a geographical coordinates computed based on data received from GNSS satellites. Non-limiting examples of GNSS include, Global Positioning System (GPS), Galileo, GLONASS and BeiDou. The first communication unit 122 enables the End-of-Train device 110 to communicate with the Head-of-Train device 108 through Radio-Frequency (RF) Communication, i.e., via the telemetry link 112.

Figure 1C:
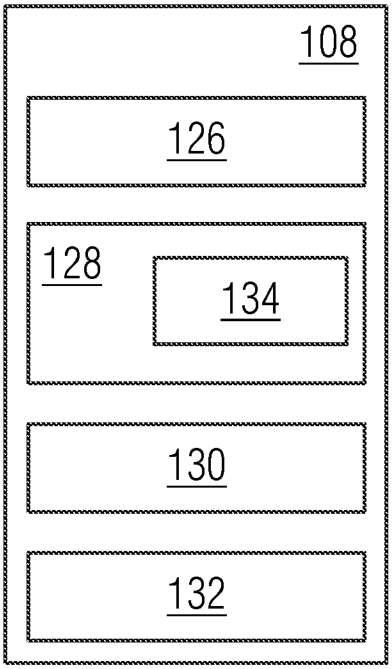
FIG. 1C illustrates a block diagram of a Head-of-Train device, in accordance with an embodiment of the present invention.

The Head-of-Train device 108 comprises a second processing unit 126, a second memory 128, a second GNSS receiver 130 and a second communication unit 132 as shown in FIG. 1C. The second processing unit 126 includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit.

The second processing unit 126 may also include embedded controllers, such as generic or programmable logic devices or arrays, application specific integrated circuits, single-chip computers, and the like. In general, the second processing unit 126 comprises hardware elements and software elements. The second processing unit 126 can be configured for multithreading, i.e. the second processing unit 126 hosts different calculation processes at the same time, executing the either in parallel or switching between active and passive calculation processes.

The second memory 128 includes one or more of a volatile memory and a non-volatile memory. The second memory 128 is coupled for communication with the second processing unit 126. The second processing unit 126 executes instructions and/or code stored in the second memory 128. A variety of computer-readable storage media is stored in and accessed from the second memory 128. The second memory 128 may include any suitable element for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like.

The second memory 128 comprises a second update module 134, stored in the form of machine-readable instructions and executable by the second processing unit 126. These machine-readable instructions when executed causes the second processing unit to configured for performing functions related to monitoring a failure event associated with the train 102. The second GNSS receiver 130 enables the Head-of-Train device 108 to receive GNSS data from a plurality of GNSS satellites. Based on the GNSS data, the second processing unit determines a geospatial location of the Head-of-Train device 108. The second communication unit 132 enables the Head-of-Train device 108 to communicate with the End-of-Train device 110 through Radio-Frequency (RF) Communication. In addition, the second communication unit 132 may also include circuitry that enables the Head-of-Train device 108 to receive data from the sensing unit 106.

Figure 1D:
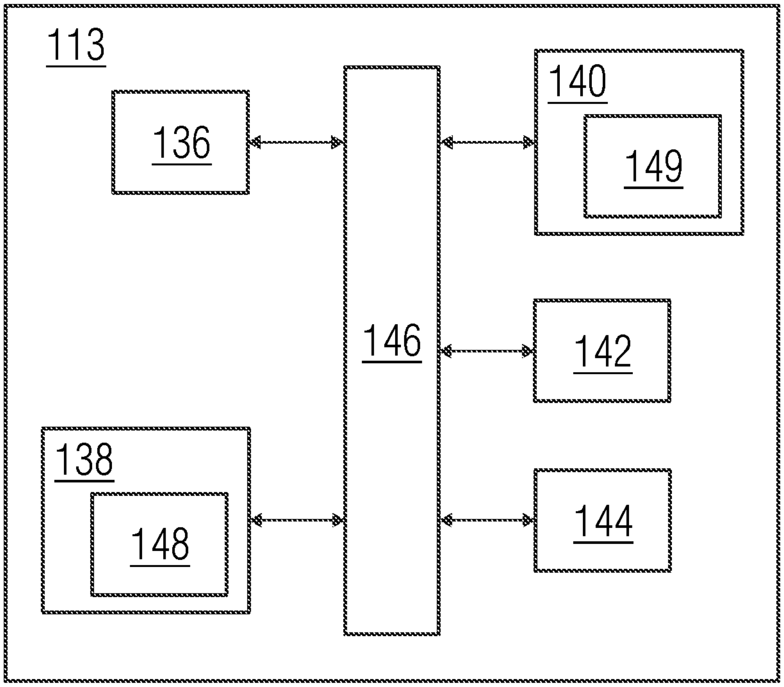
FIG. 1D illustrates a block diagram of a central server, in accordance with an embodiment of the present invention.

The central server 113 comprises a third processing unit 136, a third memory 138, a storage unit 140, a third communication unit 142, a network interface 144, a standard interface or bus 146 as shown in FIG. 1D. The central server 113 can be a (personal) computer, a workstation, a virtual machine running on host hardware, a microcontroller, or an integrated circuit. As an alternative, the central server 113 can be a real or a virtual group of computers (the technical term for a real group of computers is "cluster", the technical term for a virtual group of computers is "cloud").

The storage unit 140 comprises a non-volatile memory which includes a database 149. In an implementation, the database 149 may store unique identifiers corresponding to the Head-of-Train devices and End-of-Train devices for every train operating within a geographical territory. In an example, the unique identifiers are assigned to each of the Head-of-Train devices and End-of-Train devices by an Original Equipment Manufacturer. In another example, the unique identifiers are provided based on naming conventions specified by railway authorities. As the Head-of-Train device 108 is fixed permanently to a locomotive, a unique identifier associated with the locomotive or the train 102 may also be used in place of the unique identifier of the Head-of-Train device 108.

In yet another example, the unique identifiers corresponding to the Head-of-Train device 108 and the End-of-Train device 110 is mapped to a unique identifier associated with the train 102 by a driver of the train 102. The driver may further update the central server 113 with the unique identifiers through a client device (not shown). In yet another example, the driver or a maintenance personnel may configure the End-of-Train device 110 using a unique identifier associated with the Head-of-Train device 108. Further, the End-of-Train device 110 may update the database 149 by transmitting a message containing the unique identifiers corresponding to the End-of-Train device 110 and the Head-of-Train device 108 to the central server 113, upon configuration. In yet another embodiment, the driver may configure the Head-of-Train device 108 with a unique identifier of the train 102. Upon configuration, the Head-of-Train device 108 may further transmit the unique identifier of the train 102 to the central server 113.

The database 149 may also store identifiers associated with one or more receiving devices 150. The receiving device 150 may be any electronic device configured to send and receive data from the central server 113, and may be associated with an adjacent train or an operator control station. In an embodiment, the adjacent train is any train identified to be geographically closest to the latest location shared by the train 102. The adjacent train may be identified based on the GNSS location of the train. In another embodiment, one or more adjacent trains may be identified within a predefined radius of the latest location of the train 102. For example, all trains within 10 km radius of the latest location may be identified as adjacent trains. The operator control stations are control centers responsible for taking crucial decisions for smooth operation of railways in a specific region. For example, the operator control stations may determine rail routes for trains based on availability of railway tracks. In addition, the operator control stations may also control signalling operations related to controlling movement of trains in the region.

The bus 146 acts as interconnect between the third processing unit 136, the third memory 138, the storage unit 140, and the network interface 144. The third communication unit 142 enables the central server 113 to communicate with the Head-of-Train device 108 and the End-of-Train device 110. The third communication unit 142 may support different standard communication protocols such as Transport Control Protocol/Internet Protocol (TCP/IP) and Internet Protocol Version (IPv).

The third processing unit 136 may include any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The third processing unit 136 may also include embedded controllers, such as generic or programmable logic devices or arrays, application specific integrated circuits, single-chip computers, and the like. In general, the third processing unit 136 may comprise hardware elements and software elements. The third processing unit 136 can be configured for multithreading, i.e., the third processing unit 136 may host different calculation processes at the same time, executing the either in parallel or switching between active and passive calculation processes.

The third memory 138 includes one or more of a volatile memory and a non-volatile memory. The third memory 138 is coupled for communication with the third processing unit 136. The third processing unit 136 executes instructions and/or code stored in the third memory 138. A variety of computer-readable storage media is stored in and accessed from the third memory 138. The third memory 138 includes any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like.

The third memory 138 comprises an emergency management module 148 configured for detecting failure of the train 102 within a tunnel and for broadcasting emergency alert messages indicating the failure of the train 102 to the one or more receiving devices 150. The emergency management module 148 is stored in the third memory 138 in the form of machine-readable instructions and executable by the third processing unit 136. These machine-readable instructions when executed causes the third processing unit 136 to monitor a failure event associated with the train 102.

The End-of-Train device 110 periodically transmits a latest location of the train 102 to the central server 113. In case the train 102 is approaching the tunnel 104, the sensing unit 106 measures a distance to the tunnel 104. Further, the sensing unit 106 transmits the measured distance to the Head-of-Train device 108. The Head-of-Train device 108 further computes an estimated crossing time for crossing the tunnel 104 based on the measured distance, a length of the tunnel 104, a length of the train 102 and a speed of the train 102. In an embodiment, the speed of the train 102 is a permissible speed limit of the train 102 within the tunnel 104. In another embodiment, the speed of the train 102 is a current speed of the train 102. The length of the tunnel 104 is determined based on a latest location of the train 102 determined by the End-of-Train device 110. In an embodiment, the Head-of-Train device 108 may determine a time at which the estimated crossing time is to be transmitted to the central server 113.

In an embodiment, tunnels in each location is identified by a unique identifier stored in the first memory 118 of the End-of-Train device 110. The End-of-Train device 110 may also store a predefined length associated with each of the tunnels. The End-of-Train device 110 may further transmit the predefined length to the Head-of-Train device 108 as the train 102 approaches the tunnel. For example, if the latest location of the train 102 is 41° 24'12.2"N 2° 10'26.5"E, the tunnel 104 may be identified as ABC freight tunnel based on an identifier stored against 41° 24'12.2"N 2° 10'26.5"E in the first memory 118. The predefined length associated with the ABC freight tunnel is further identified from the second memory 128 of the End-of-Train device 110. In another embodiment, a driver may manually configure the Head-of-Train device 108, via a Driver-Machine Interface, with lengths of various tunnels along a route. In yet another embodiment, the central server 113 identifies the tunnel 104 based on the latest location shared by the End-of-Train device 110. Based on the latest location, the central server 113 identifies the tunnel 104. Further, the central server 113 transmits the length of the tunnel 104 to the Head-of-Train device 108.

In an implementation, the length of the train is provided as input, by a driver of the train, through a Driver Machine Interface. In another implementation, the length of the train is computed at the Head-of-Train device 108 or the End-of-Train device 110 based on the GNSS locations of the Head-of-Train device 108 and the End-of-Train device 110. In an embodiment, the End-of-Train device 110 may compute the length of the train 102 based on the GNSS locations and transmit the computed length to the Head-of-Train device 108 periodically. In another embodiment, the Head-of-Train device 108 determines the length of the train 102 based on inputs from balises installed on the railway track and a tachometer attached to a wheel of the train.

When the train 102 passes through the tunnel 104, the telemetry link 112 may get disrupted. Subsequently, if a failure associated with the train 102 occurs within the tunnel, the central server 113 detects the failure as explained below with reference to the method 200 shown in FIG. 2.

Figure 2:
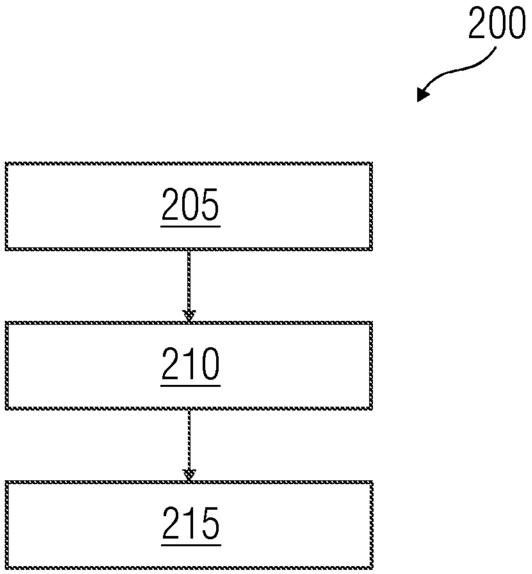
FIG. 2 shows a method of monitoring failure of the train within the tunnel, in accordance with an embodiment of the present invention.

FIG. 2 shows a method 200 of monitoring failure of the train 102 within the tunnel 104, in accordance with an embodiment of the present invention. The method is explained in conjunction with FIGS. 1A, 1B, 1C and 1D. At step 205, an estimated crossing time for the train 102 to cross the tunnel 104 and the latest location of the train 102 is received, by the central server 113, from an telemetry system onboard the train 102. In particular, the Head-of-Train device 108 firstly computes the estimated crossing time for crossing a tunnel 104 based on a distance to the tunnel 104, a length of the tunnel 104, a length of the train 102 and a speed of the train 102. The Head-of-Train device 108 firstly determines a total length by adding the length of the tunnel 104, the length of the train 102 and the distance to the tunnel 104, i.e., $$\text{Total length}=\text{length of tunnel}+\text{length of train}+\text{distance to tunnel}$$

Further, based on the total length and the speed of the train 102, the Head-of-Train device 108 computes the estimated crossing time, i.e., Estimated crossing time=total length/speed of the train The Head-of-Train device 108 further transmits the estimated crossing time to the End-of-Train device 110 via the telemetry link 112. The End-of-Train device 110 transmits the estimated crossing time estimated crossing timealong with other parameters such as the GNSS location of the End-of-Train device 110 to the central server 113. In an implementation, the End-of-Train device 110 transmits a periodic update message. The periodic update message includes several data fields including a location field and a tunnel detection field. The location field may indicate the GNSS location of the train 102 and the tunnel detection field may indicate whether a tunnel is detected ahead of the train 102 by the sensing unit 106. In an example, the tunnel detection field may a single bit which is set as '1' in case a tunnel is detected. Otherwise, the tunnel detection field is set as '0'. In addition, the periodic update message may also include a time-stamp corresponding to the GNSS location. In another implementation, the End-of-Train device 110 transmits an update message at a time-stamp computed based on the distance to the tunnel 104 and a speed of the train 102.

In an embodiment, the central server 113 initiates a timer application upon receiving the estimated crossing time. In an example, the timer application further triggers the central server 113 to reinstate a communication with the telemetry immediately after the estimated crossing time. In another example, the timer application also adds a predefined buffer time to the estimated crossing time. For example, if the estimated crossing time is 6 mins and the predefined buffer time is 3 mins, the timer application recomputes the estimated crossing time as 9 mins. Further, the central server 113 attempts to establish communication with the telemetry.

At step 210, the central server 113 detects failure event associated with the train 102 if the attempt to establish communication with the telemetry system is unsuccessful after the estimated crossing time. More specifically, if the train 102 is still inside the tunnel 104 at the estimated crossing time, attempts to establish the communication fails. In other words, failure to reestablish the communication after the estimated crossing time is an indicator that the train 102 has failed inside the tunnel 104.

At step 215, the central server 113 broadcasts an emergency alert message indicating the failure event to the one or more receiving devices 150 based on the latest location of the train 102. The term failure event as used herein refers to any event associated with the train 102, that may prevent further movement of the train 102. Non-limiting examples of failure events include derailment of the train 102, accidental decoupling of the train 102, application of emergency brakes, faults in a railway track ahead of the train 102 or a mechanical breakdown of a locomotive of the train 102. The receiving device is associated with at least one of an operator control station and an adjacent train. In an example, railway personnel associated with the operator control station may provide necessary assistance for retrieving the train 102 from the tunnel 104. In addition, the operator control station may also provide instructions to reroute or delay other trains following the same route until the train 102 is retrieved from the tunnel 104.

The receiving devices 150 on the adjacent trains may receive the emergency alert message from the central server 113 in order to determine a next course of action. The next course of action is associated with avoiding a collision of the adjacent train with the train 102. For example, the next course of action may be associated with determining an alternate route to be taken by the adjacent train in order to avoid the railway track where the failure event has occurred. The alternate route may be determined by a GNSS-based application installed on the receiving device 150 or an dedicated subsystem onboard the adjacent train. In another example, the next course of action may be associated with instructing an controlling a speed of the adjacent train. For example, the receiving device 150 may instruct an onboard subsystem to reduce a speed of the adjacent train 102 such that a safe distance is maintained between the train 102 and the adjacent train. In an implementation, the receiving device 150 on the adjacent train selects the next course of action automatically. In another implementation, the receiving device 150 on the adjacent train generates a list of options to the driver of the adjacent train on a Driver Machine Interface. Further, the driver may choose an option from the list, for execution.

Figure 3:
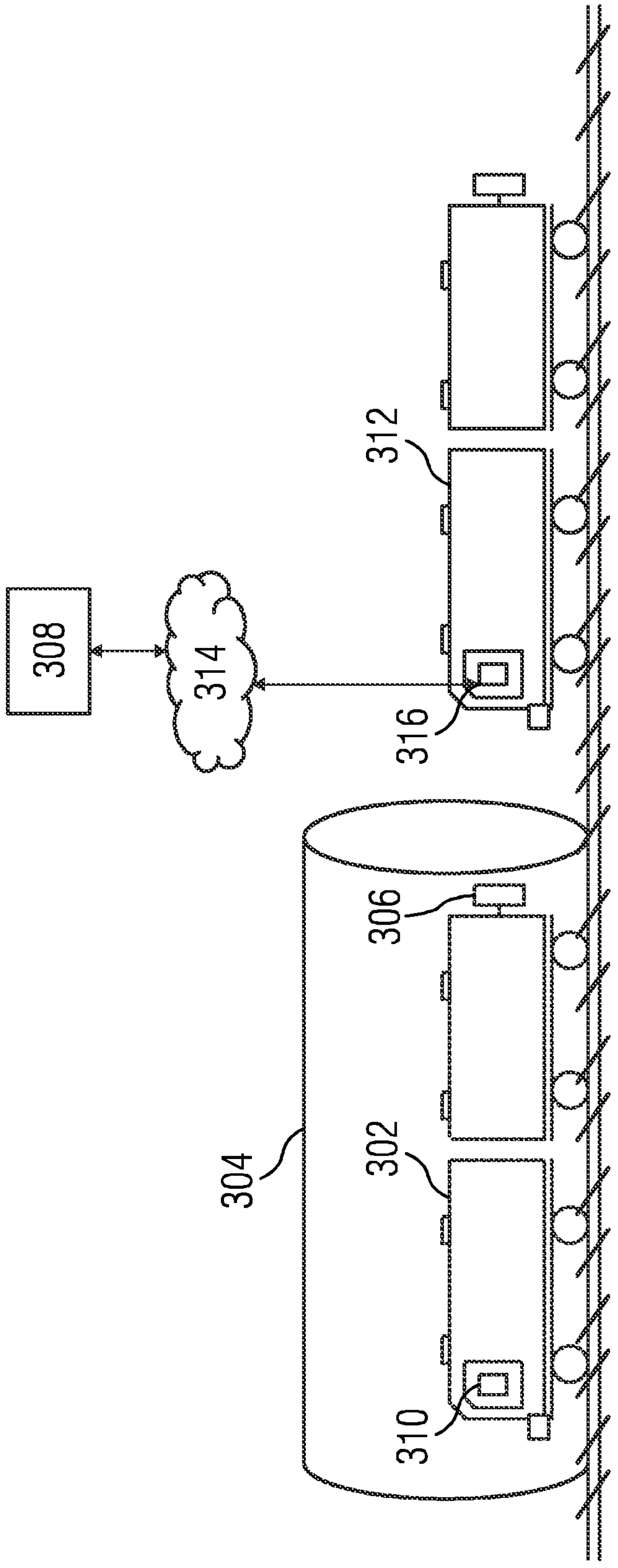
FIG. 3 illustrates monitoring of a train inside a tunnel, in accordance with an exemplary embodiment of the present invention.

FIG. 3 illustrates monitoring of a train 302 inside a tunnel 304, in accordance with an exemplary embodiment of the present invention. In the present embodiment, the train 302 experiences a breakdown within the tunnel 304. As the train 302 enters the tunnel 304, an End-of-Train device 306 (similar to the End-of-Train device 110 as shown in FIG. 1A) associated with the train 302 transmits a latest location along with the estimated crossing time for crossing the tunnel 304 to a central server 308 (similar to the central server 113). The central server 308 communicates with the End-of-Train device 306 until communication between the End-of-Train device 306 is disrupted due to lack of network coverage within the tunnel 304. In other words, the End-of-Train device 306 fails to establish a communication link with the central server 308 via the network 114 while inside the tunnel.

After the estimated crossing time is over, the central server 308 attempts to reestablish communication with the End-of-Train device 306. Similarly, the central server 308 may also attempt to establish communication with a Head-of-Train device 310 (similar to the Head-of-Train device 108) associated with the train 302. However, as the train 302 is stuck inside the tunnel 304 due to the breakdown, both the End-of-Train device 306 and the Head-of-Train device 310 continue to be out of network coverage after the estimated crossing time. Consequently, the central server 308 detects the failure of the train 302.

The central server 308 further broadcasts an emergency alert message indicating failure of the train 302 to an adjacent train 312 via a network 314 (similar to network 114). In particular, the emergency alert message is received by receiving device 316 onboard the adjacent train 312. In an example, the receiving device 316 may be a Driver-Machine Interface. In another example, the receiving device 316 may be a personal digital assistant associated with a driver of the adjacent train 312. The emergency alert message may include information associated with the train 302. The information may include, for example, the latest location updated by the End-of-Train device 306. The central server 308 identifies the adjacent train 312 based on the latest location received from the End-of-Train device 306. The adjacent train 312 is any train identified to be closest to the latest location shared by the train 302.

In an embodiment, the telemetry system may identify a type of the failure event based on outputs from one or more sensing units onboard the train 302. For example, derailment of the train 302 may be identified based on tilt sensors installed on the train 302. Similarly, emergency braking may be identified based on brake pressure sensed at the End-of-Train device 306. However, as the telemetry system is unable to establish communication with the central server 308 inside the tunnel 304, the End-of-Train device 306 or the Head-of-Train device 310 may store information related to the type of failure. Upon re-establishing communication, the information on the type of failure is transmitted to the central server 308.

In addition to the above, accidental decoupling of a train may be monitored as described with reference to FIG. 4 below. The term 'decoupling' as used herein refers to separation of one or more cabins towards a rear end of the train from the rest of the train.

Figure 4:
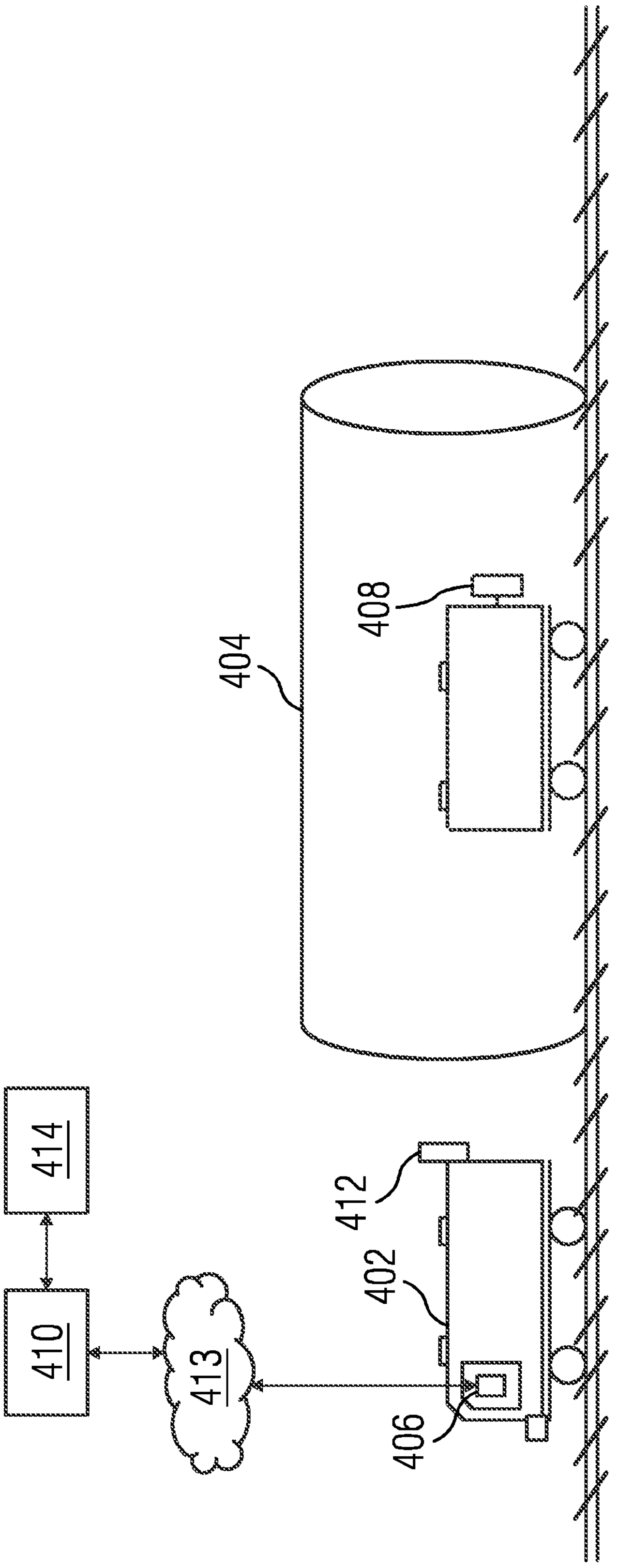
FIG. 4 illustrates monitoring of a train inside a tunnel, in accordance with another exemplary embodiment of the present invention.

FIG. 4 illustrates monitoring of a train 402 inside a tunnel 404, in accordance with another exemplary embodiment of the present invention. In the present embodiment, accidental decoupling of the train 402 occurs within the tunnel 404. When decoupling occurs within the tunnel 404, a brake pipe pressure is released due to division of the train 402 into two section. If a first section of the train 402 continues to move forward, a Head-of-Train device 406 of the train 402 attempts to determine the length of the train 402. The length of the train 402 is determined based on the GNSS location of an End-of-Train device 408 associated with the train 402. As in the previous embodiments, the length of the train 402 is computed by at least one of the Head-of-Train device 406 and the End-of-Train device 408. When the Head-of-Train device 406 comes out of the tunnel 404, the telemetry system attempts to determine the length of the train 402 based on the GNSS locations of the Head-of-Train device 406 and the End-of-Train device 408. If communication between the Head-of-Train device 406 and the End-of-Train device 408 is possible, an increase in the length of the train 402 compared to a previous instance indicates the accidental decoupling.

In case communication between the Head-of-Train device 406 and the End-of-Train device 408 is not reinstated even after an estimated crossing time for crossing the tunnel 404, the Head-of-Train device 406 identifies the accidental decoupling or a potential failure of the End-of-Train device 408. The estimated crossing time for crossing the tunnel is computed as explained earlier using FIGS. 1A to 2. The Head-of-Train device 406 initiates communication with the End-of-Train device 408 over periodic intervals of time upon entering the tunnel 404. For example, the Head-of-Train device 108-406 initiates communication with the End-of-Train device 408 every 1 minute. The Head-of-Train device 406 detects the failure event when the attempt to initiate communication with the End-of-Train device 408 fails after the estimated crossing time. For example, if the estimated crossing time is 6 minutes, the Head-of-Train device 406 may make six attempts to communicate with the End-of-Train device 408. If the seventh attempt fails, the Head-of-Train 408-406 device detects accidental decoupling of the train 402. In the present embodiment, the Head-of-Train device 406 of the train 402 establishes communication with a central server 410 (similar to the central server 113) upon exiting the tunnel 404 after the estimated crossing time.

In the present embodiment, the telemetry system of the train 402 also includes one or more Middle of Train devices 412 configured to act as repeaters between the Head-of-Train device 406 and the End-of-Train device 408. The Middle-of-Train device 412 is also configured to communicate with the central server 410. Similar to the Head-of-Train device 406, the Middle-of-Train device 412 is also configured to identify the accidental decoupling of the train 402 based on failed attempts to establish communication with the End-of-Train device 408. In other words, the Middle-of-Train device 412 supports the Head-of-Train device 406 in detecting the accidental decoupling of the train 402. The Middle-of-Train device 412 may also indicate to the Head-of-Train device 406 about the accidental decoupling by transmitting a warning message to the Head-of-Train device 406. In addition, the Middle-of-Train device 412 is also configured to transmit a GNSS location of the Middle-of-Train device 412 to the Head-of-Train device 406. The Head-of-Train device 406 may further determine an length of the train 402 based on the GNSS location of the Middle-of-Train device 412.

Upon identifying the accidental decoupling, at least one of the Head-of-Train device 406 or the Middle-of-Train device 412 establishes communication with the central server 410, in order to transmit an integrity status message indicating the accidental decoupling to the central server 410. The Head-of-Train device 406 transmits the integrity status message via a network 413. The integrity status message may include information such as an identity of the train 402, a GNSS location of the Head-of-Train device 406, a time stamp associated with the GNSS location and a time-stamp corresponding to the last communication with the End-of-Train device 408.

After receiving the integrity status message, the central server 410 repackages information in the integrity status message received from the Head-of-Train device 406 to form an emergency alert message. Further, the central server 410 broadcasts an emergency alert message indicating the failure event, i.e. accidental decoupling of the train 402, to one or more receiving devices 414. The one or more receiving devices 414 is associated with adjacent trains and/or an operator control station, as explained in case of the previous embodiments. In an embodiment, the central server 410 also transmits one or more service messages to the Head-of-Train device 406 in order to guide a driver of the train to perform an action. For example, the one or more service messages may instruct the drive to stop the locomotive and may also include an emergency contact that the driver may contact for assistance.

In a further embodiment, if the central server successfully re-establishes communication with the End-of-Train device, a clear message is transmitted to the receiving devices. The clear message indicates that the failure event associated with the train is resolved. In other words, the clear message intimates the receiving devices that no further assistance is required for retrieving the train from the tunnel. In an example, the receiving device clears a previously received emergency alert message upon receiving the clear message. Consequently, the receiving devices on adjacent trains may adjust the speed or select the route in order to follow a predetermined schedule.

Advantageously, the present invention enables notification of failure of a train inside a tunnel, to concerned operator control stations in a timely manner. The present invention also enables alerting of adjacent trains about the failure in order to avoid collision-related accidents and also for adjusting a schedule or route of the adjacent train accordingly.

The present invention is not limited to a particular computer system platform, processing unit, operating system, or network. One or more aspects of the present invention is distributed among one or more computer systems, for example, servers configured to provide one or more services to one or more client computers, or to perform a complete task in a distributed system. For example, one or more aspects of the present invention is performed on a client-server system that comprises components distributed among one or more server systems that perform multiple functions according to various embodiments. These components comprise, for example, executable, intermediate, or interpreted code, which communicate over a network using a communication protocol. The present invention is not limited to be executable on any particular system or group of system, and is not limited to any particular distributed architecture, network, or communication protocol.

While the invention has been illustrated and described in detail with the help of a preferred embodiment, the invention is not limited to the disclosed examples. Other variations can be deducted by those skilled in the art without leaving the scope of protection of the claimed invention.

The invention claimed is:

1. A system for monitoring failure of a train within a tunnel, the system comprising:

a telemetry system situated onboard the train, wherein the telemetry system comprises a Head-of-Train device communicatively coupled to an End-of-Train device, a remotely located central server connected to the telemetry system via a network, wherein the remotely located central server comprises a storage unit including a database, the database storing unique identifiers of the Head-of-Train device and the End-of-Train device, a receiving device configured to send and receive data from the remotely located central server and associated with at least one of an operator control station and an adjacent train, wherein the database of the remotely located central server further stores an identifier of the receiving device, wherein the Head-of-Train device is configured to:

calculate an estimated crossing time for crossing the tunnel based on a distance to the tunnel, a length of the tunnel, a length of the train and a current speed of the train; and transmit the estimated crossing time to the End-of-Train device;

wherein the End-of-Train device is configured to:

receive the estimated crossing time from the Head-of-Train device; and transmit the estimated crossing time and a latest location of the train to the remotely located central server;

wherein the remotely located central server is configured to:

receive the estimated crossing time and the latest location of the train from the telemetry system;

initiate a timer application upon receipt of the estimated crossing time including adding a buffer time to the estimated crossing time, reinstate communication with the telemetry system after expiration of the estimated crossing time including buffer time, detect a failure event associated with the train in response to an unsuccessful attempt to establish communication with the telemetry system after the estimated crossing time including buffer time; and broadcast an emergency alert message indicating the failure event to the receiving device based on the latest location of the train.

2. The system of claim 1, further comprising a sensing unit communicatively coupled to the Head-of-Train device, wherein the sensing unit is configured to:

detect presence of the tunnel ahead of the train; and measure the distance to the tunnel, from the train, in real-time, upon detecting presence of the tunnel.

3. The system of claim 2, wherein the sensing unit comprises at least one of an image sensor, a LIDAR sensor, an infrared sensor and an ultrasonic sensor.

4. The system of claim 1, wherein the telemetry further comprises at least one subsystem configured to:

detect accidental decoupling of the train when an attempt to initiate communication with the End-of-Train device fails after the estimated crossing time; and transmit an integrity status message indicating the accidental decoupling to the central server.

5. The system of claim 4, wherein the at least one subsystem is the Head-of-Train device.

6. The system of claim 4, wherein the at least one subsystem is a Middle-of-Train device.

7. The system of claim 4, wherein the central server is further configured to:

receive the integrity status message indicating the accidental decoupling of the train, from the at least one subsystem; and broadcast an emergency alert message to the one or more receiving devices based on the integrity status message received.

8. The system of claim 7, wherein the central server is further configured to: identify the adjacent train based on the latest location received from the End-of-Train device.

9. The system of claim 1, wherein the central server is further configured to:

broadcast a clear message to the one or more receiving devices if the communication with the telemetry is reinstated after detecting the failure event, wherein the clear message indicates resolution of the failure event.

10. A method for monitoring failure of a train within a tunnel, the method comprising:

receiving, by a remotely located central server, an estimated crossing time for the train to cross the tunnel and a latest location of the train from a telemetry system onboard the train, wherein the telemetry system comprises a Head-of-Train device communicatively coupled to an End-of-Train device, and wherein the estimated crossing time for crossing the tunnel is calculated by the Head-of-Train device based on a distance to the tunnel, a length of the tunnel, a length of the train and a current speed of the train;

initiating, by the remotely located central server, a timer application upon receipt of the estimated crossing time including adding a buffer time to the estimated crossing time, reinstating communication with the telemetry system after expiration of the estimated crossing time including buffer time, detecting, by the remotely located central server, a failure event associated with the train in response to an unsuccessful attempt to establish communication with the telemetry system after the estimated crossing time including buffer time; and broadcasting, by the remotely located central server, an emergency alert message indicating the failure event to a receiving device based on the latest location of the train, wherein the receiving device is associated with at least one of an operator control station and an adjacent train, wherein the remotely located central server is connected to the telemetry system via a network, and wherein the remotely located central server comprises a storage unit including a database, the database storing unique identifiers of the Head-of-Train device and the End-of-Train device, wherein the database of the remotely located central server further stores an identifier of the receiving device, and wherein the receiving device is configured to send and receive data from the remotely located central server.

11. The method of claim 10, wherein the distance to the tunnel from the train, is measured by a sensing unit communicatively coupled to the Head-of-Train device, in real-time, upon detecting presence of the tunnel.

12. The method of claim 10, further comprising:

receiving, by the central server, an integrity status message indicating accidental decoupling of the train, from at least one subsystem; and broadcasting, by the central server, an emergency alert message to the one or more receiving devices based on the integrity status message received.

13. The method of claim 12, wherein the accidental decoupling of the train is detected, by the at least one subsystem, when an attempt to initiate communication with the End-of-Train device fails after the estimated crossing time.

14. The method of claim 12, wherein the at least one subsystem is the Head-of-Train device.

15. The method of claim 12, wherein the at least one subsystem is a Middle-of-Train device.

16. The method of claim 12, further comprising:

identifying the adjacent train, by the central server, based on the latest location received from the End-of-Train device.

17. The method of claim 10, further comprising:

broadcasting, by the central server, a clear message to the one or more receiving devices if communication with the telemetry is reinstated after detecting the failure event, wherein the clear message indicates resolution of the failure event.

* * * * *